(12) United States Patent
Nunnink et al.

(10) Patent No.: US 11,048,888 B1
(45) Date of Patent: *Jun. 29, 2021

(54) ON-AXIS AIMER FOR VISION SYSTEM AND MULTI-RANGE ILLUMINATOR FOR SAME

(71) Applicant: Cognex Corporation, Natick, MA (US)

(72) Inventors: Laurens Nunnink, Simpleveld (NL); Saul Sanz Rodriguez, Aachen (DE)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,662

(22) Filed: Jul. 8, 2019

Related U.S. Application Data

(63) Continuation of application No. 13/797,820, filed on Mar. 12, 2013, now Pat. No. 10,346,645.

(51) Int. Cl.
| | |
|---|---|
| *G06K 19/00* | (2006.01) |
| *G06K 7/015* | (2006.01) |
| *F21V 13/04* | (2006.01) |
| *G03B 3/00* | (2021.01) |
| *G06K 7/10* | (2006.01) |
| *F21V 5/04* | (2006.01) |

(52) U.S. Cl.
CPC ............... *G06K 7/015* (2013.01); *F21V 5/04* (2013.01); *F21V 13/04* (2013.01); *G03B 3/00* (2013.01); *G06K 7/10881* (2013.01)

(58) Field of Classification Search
CPC ...... G06K 7/015; G06K 7/10881; F21V 5/04; F21V 13/04; G03B 3/00
See application file for complete search history.

(56) References Cited

U.S. PATENT DOCUMENTS

| | | | |
|---|---|---|---|
| 4,349,838 A | 9/1982 | Daniel | |
| 4,386,848 A | 6/1983 | Clendenin | |
| 5,296,689 A | 3/1994 | Reddersen | |
| 5,550,364 A | 8/1996 | Rudeen | |
| 5,627,360 A * | 5/1997 | Rudeen | G06K 7/10564 235/462.21 |
| 5,912,451 A | 6/1999 | Gurevich | |
| 6,039,254 A | 3/2000 | Froese-Peeck | |
| 7,350,711 B2 | 4/2008 | He | |
| 7,577,353 B2 | 8/2009 | Gaessler | |
| 8,061,616 B2 | 11/2011 | Goren | |
| 8,081,297 B2 | 12/2011 | Bridges | |

(Continued)

*Primary Examiner* — Matthew Mikels
(74) *Attorney, Agent, or Firm* — Loginov & Associates, PLLC; William A Loginov

(57) ABSTRACT

This invention provides an aimer assembly for a vision system that is coaxial (on-axis) with the camera optical axis, thus providing an aligned aim point at a wide range of working distances. The aimer includes a projecting light element located aside the camera optical axis. The beam and received light from the imaged (illuminated) scene are selectively reflected or transmitted through a dichoric mirror assembly in a manner that permits the beam to be aligned with the optical axis and projected to the scene while only light from the scene is received by the sensor. The aimer beam and illuminator employ differing light wavelengths. In a further embodiment, an internal illuminator includes a plurality of light sources below the camera optical axis. Some of the light sources are covered by a prismatic structure for close distance, and other light sources are collimated, projecting over a longer distance.

20 Claims, 9 Drawing Sheets

(56) References Cited

U.S. PATENT DOCUMENTS

| | | | |
|---|---|---|---|
| 10,346,645 B1* | 7/2019 | Nunnink | ............ F21V 5/04 |
| 2002/0149745 A1 | 10/2002 | Fukuma | |
| 2006/0081712 A1 | 4/2006 | Rudeen | |
| 2012/0118963 A1 | 5/2012 | Drzymala | |

* cited by examiner

ON-AXIS AIMER FOR VISION SYSTEM AND MULTI-RANGE ILLUMINATOR FOR SAME

FIELD OF THE INVENTION

This invention relates to machine vision systems and more particularly to aimers and illuminators used typically in handheld ID code readers.

BACKGROUND OF THE INVENTION

Machine vision systems (also simply termed "vision systems") use image acquisition devices that include camera sensors to deliver information on a viewed subject. The system then interprets this information according to a variety of algorithms to perform a programmed decision-making and/or identification function. An image of an object containing features of interest to the system is acquired by an on-board image sensor (also termed, simply an "imager" or "sensor") in the visible, and/or near-visible light range under appropriate illumination, which can be based upon ambient light, and/or light provided by an internal and/or external illuminator.

A common task for vision systems is the reading and decoding of symbology (e.g. one-dimensional and two-dimensional codes—also termed "IDs") are used in a wide range of applications and industries and can take the form of 1D barcodes, 2D DataMatrix Codes, QR Codes and Dot-Codes, among others. The image sensor acquires images (typically grayscale or color, and in one, two or three dimensions) of the subject or object, and processes these acquired images using an on-board or interconnected vision system processor. The processor often includes both processing hardware and non-transitory computer-readable program instructions (software) that perform one or more vision system processes to generate a desired output based upon the image's processed information. This image information is typically provided within an array of image pixels each having various colors and/or intensities. In the example of an ID reader (also termed herein, a "camera"), the user or an automated process acquires an image of an object that is believed to contain one or more barcodes, 2D codes or other ID types. The image is processed to identify encoded features, which are then decoded by a decoding process and/or processor to obtain the inherent alphanumeric data represented by the code.

A common form of ID reader used in industrial (and other commercial) applications is the handheld ID reader. This type of reader typically includes a grip that enables the user to carry the reader around a floor space and aim the device at various objects. The grip is provided with one or more trigger buttons that allow the user to direct the acquisition of an image of an object containing an ID after it is aimed at that object. This acquired image is then decoded and the information is transmitted (typically wirelessly) to a receiving unit. The receiving unit transfers the information to another data-handling system, such as an inventory tracking or logistics application running on a server or other computing device (e.g. a PC).

In some vision system applications, particularly handheld ID reading, a projected mark or pattern in the field of view can assist the user in aligning the object's ID code with the reader's camera assembly. This alignment can better ensure a successful read and decoding of the imaged ID. Thus an "aimer" that projects a so-called "aimer pattern" projects one or more bright spots onto the field of view. Several approaches to aimers have been provided in prior designs.

In one approach, an aimer pattern is generated by an optical system parallel to the camera optical axis. The distance between the camera optical axis and the center of the aimer pattern remains the same for all distances, but as the field of view of the camera is increasing at larger distances, the relative offset in the camera image decreases at larger distances. Thus the actual aim point of the system varies at varying distances with larger distances proving more accurate. Alternatively, in another approach, an aimer pattern is generated by an optical system located aside the camera optical axis. This results in an aimer pattern that, at larger or smaller distances, is off-center from the camera optical axis and not predictably located in the field of view. Thus the aim point is only truly aligned at one distance. In yet another approach, an aimer pattern is generated by multiple optical systems symmetrically positioned around the camera, in such way that the center of the pattern is on the camera axis at all distances. This approach requires more space and more projecting lasers (e.g. laser diodes) or LEDs. Also, while the multiple lasers/LEDs can be angled to coincide with variation in the field of view, they do not produce a particular aim point, and may be less intuitive in acquiring a target ID to an inexperienced user. Thus, each of these prior approaches has disadvantages either in the variation of the aim point from the camera optical axis over distance or in complexity and intuitiveness.

A further challenge in designing an ID reader (or other vision system) that is to be used variably at different ranges is that close illumination and distant illumination often require different optical arrangements. An illumination pattern that fully washes a field of view at a short or no distance (i.e. with the reader placed directly against the ID-bearing surface) may not fully illuminate a surface at long distances. Likewise, a long range illuminator is designed to spread out over distance and can appear as discontinuous spots at short distance. In the case of internal illumination, integrated within the housing of a vision system device, space can be limited and the cost of providing a reliable illumination assembly is a concern.

SUMMARY OF THE INVENTION

This invention overcomes disadvantages of the prior art by providing an aimer assembly for a vision system that is coaxial (on-axis) with the camera optical axis, thus providing an aligned aim point at a wide range of working distances. The aimer includes a projecting light element (e.g. an LED or laser diode) located aside the camera optical axis. According to a variety of illustrative arrangements, a reflecting assembly (e.g. mirror or prism), which illustratively includes a dichoric element, is adapted to reflect certain wavelengths of light and transmit differing wavelengths of light. The camera sensor, aimer beam light source and mirror assembly are arranged so that illumination light of one wavelength from the scene to the sensor along the optical axis while the aimer beam of a different wavelength does not pass into the sensor, but passes along the optical axis to the scene. At least one wavelength can be a non-visible wavelength, such as IR or UV. The aimer assembly can include optics that cause the beam to diverge, thereby providing a larger aimer pattern at longer distances/larger fields of view. In a further embodiment, an internal illuminator for the vision system includes a plurality of light sources (e.g. LEDs) arranged in a strip below the camera optical axis. At least some of the light sources are covered by a light redirecting structure that spreads the light at close working distance, and other light sources can be provided with a cover and/or lens that causes the illumination light to collimate and project over a longer working distance, thus concurrently providing full illumination to the scene at both short (or no) working distance and at longer working distance. The illuminator projects a visible or non-visible wavelength that is selectively reflected or transmitted by the reflecting assembly.

In an illustrative embodiment, a vision system camera assembly having an image sensor, optics and camera optical axis is provided. An aimer light source projects an aimer light along an aimer beam axis. A reflecting assembly is constructed and arranged to either selectively (a) reflect light from the aimer light beam and transmit light from the imaged scene, or (b) reflect light from the imaged scene and transmit light from the aimer light beam, so that the aimer beam axis is substantially aligned with the camera optical axis at the imaged scene. The reflecting assembly can include one or more thin mirrors or a prism arrangement with a dichoric coating on at least one surface. Illustratively, the reflecting assembly includes a mirror residing along the camera optical axis that is a dichoric mirror or a semi-reflective mirror. Where the mirror (or other structure) is dichoric the aimer light beam defines a first wavelength that is reflected or transmitted by the dichoric mirror and the scene is illuminated in at least a second wavelength that is (respectively) transmitted by, or reflected by, the mirror assembly into the optics and the image sensor. Illustratively, the aimer light source projects the aimer light beam along a first axis approximately parallel to the camera optical axis. The reflecting assembly, in this arrangement, includes a first mirror oriented at a non-parallel angle that can be approximately a 45-degree angle to the first axis and a second mirror, residing on the camera optical axis oriented at a non-parallel angle that can be approximately a 45-degree angle to the camera optical axis. The aimer light source can include a collimator lens constructed and arranged to maintain one of (a) an approximately constant size aimer pattern over a predetermined working distance and (b) a diverging aimer pattern having a size that increases relative to the working distance. Illustratively, the vision system camera assembly is enclosed in a handheld ID reader.

In illustrative embodiments, the above-described ID reader can further include an internal illuminator assembly located in a housing thereof remote from the field of view of the vision system camera assembly that projects illumination light on the imaged scene. This internal illumination assembly can include a plurality of light sources projecting through a cover in which at least some of the light sources are collimated to illuminate at longer working distances and at let some of the light sources are directed through a light redirecting element on the cover to illuminate at shorter (or zero) working distances. In this arrangement, the mirror assembly includes a dichoric mirror and the aimer light beam defines a first wavelength that is reflected by the dichoric mirror and the illuminator assembly projects light in at least a second wavelength that passes through the dichoric mirror. Illustratively, the first wavelength is in a green visible light range and the second wavelength is in a red visible light range.

In further embodiments, an internal illuminator for a vision system having a vision system processor, an optics assembly and an image sensor is provided. The vision system includes a plurality of light sources located in a spaced-apart relationship at a position on a housing of the vision system remote from a field of view of the vision system. A cover is located between an imaged scene and the plurality of light sources. The cover includes a collimating element for at least some of the light sources that projects the light sources at a longer working distance and a light redirecting element (e.g. a prism, light pipe arrangement, Fresnel, lens, or similar structures—or combinations of multiple types of light redirecting elements) that projects at least some of the light sources at a shorter working distance. Illustratively, this vision system can comprise a handheld ID reader and can also include an aimer assembly as described above.

BRIEF DESCRIPTION OF THE DRAWINGS

The invention description below refers to the accompanying drawings, of which.

DETAILED DESCRIPTION

I. System Overview

Figure 1:
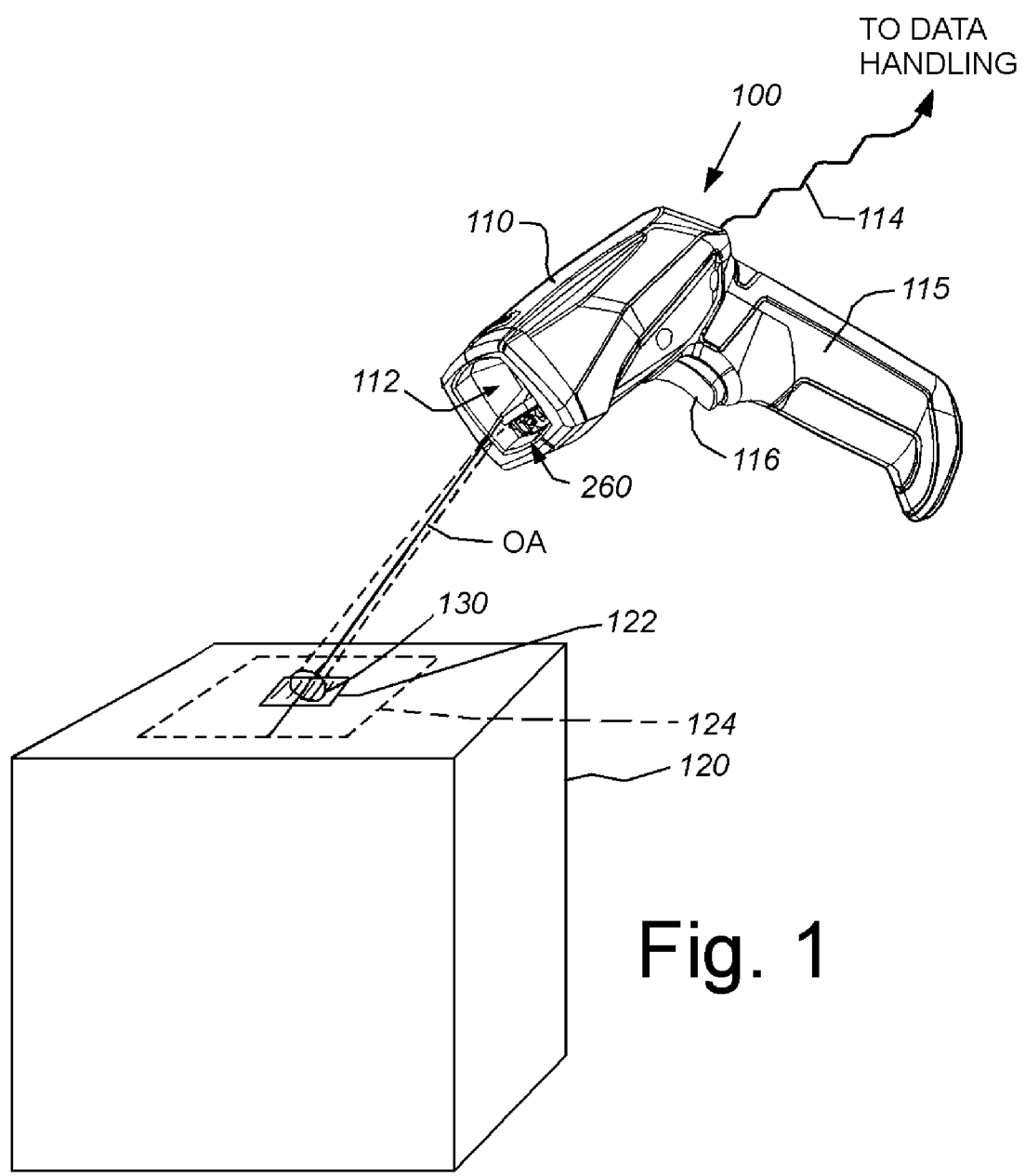
FIG. 1 is a perspective view of a handheld vision system performing an ID-reading and decoding task on an object, employing an on-axis aimer pattern to locate a canter of the imaged ID.

FIG. 1 details a handheld vision system 100 (also termed an "ID reader"). The shape and arrangement of this vision system is highly variable in alternate embodiments. In general, the system 100 includes a reading head 110 with a transparent window 112 through which illumination and aiming light (described below) is projected and light from an imaged scene is received. The reading head 110 includes vision system optics and an image sensor as well as processing components that perform vision system tasks such as ID code finding and decoding. A base unit or other receiver (not shown) allows the system to wirelessly transmit (via wireless link 114) decoded data to a data handling device such as an inventory tracking computer and/or logistics application. Alternatively, the system 100 can be wired to a data handling device/network or can store and subsequently transfer collected information when it is connected to a base unit.

A grip handle 115 is provided below the reading head 110. The grip enables the user to hold and manipulate the system and to effectively aim the reading head at a subject. The grip includes a trigger 116, which is employed to acquire images and operate the illumination assembly (described below). With an appropriate arrangement of electrical contacts (not shown—residing beneath the trigger button) the trigger 116 can be a single-stage trigger in which all functions occur in a sequence once it is pulled, or the trigger can be a two-stage trigger. That is, a partial pressing of it causes the below-described aimer to activate for targeting of a subject, and then, once properly aimed the full pressing of the trigger 116 causes the system 100 to acquire an image of the scene.

As shown, the system is imaging an exemplary object (e.g. a box) 120 containing at least one ID—in this example a 1D barcode 122. The barcode 122 resides within a field of view 124 of the system. This field of view increases with viewing distance. To ensure that the exemplary barcode 122 is properly imaged and fully within the field of view, the user directs the aimer pattern, in the form of a dot 130 onto the barcode 122, itself. This ensures that the barcode 122 resides fully within the field of view 124. Notably, the system's camera optical axis OA is substantially coaxial (on-axis) with the aimer pattern. As described below, the novel optical arrangement of the aimer assembly ensures such a coaxial relationship at all working distances (e.g. 0-200 centimeters, or more).

Figure 2:
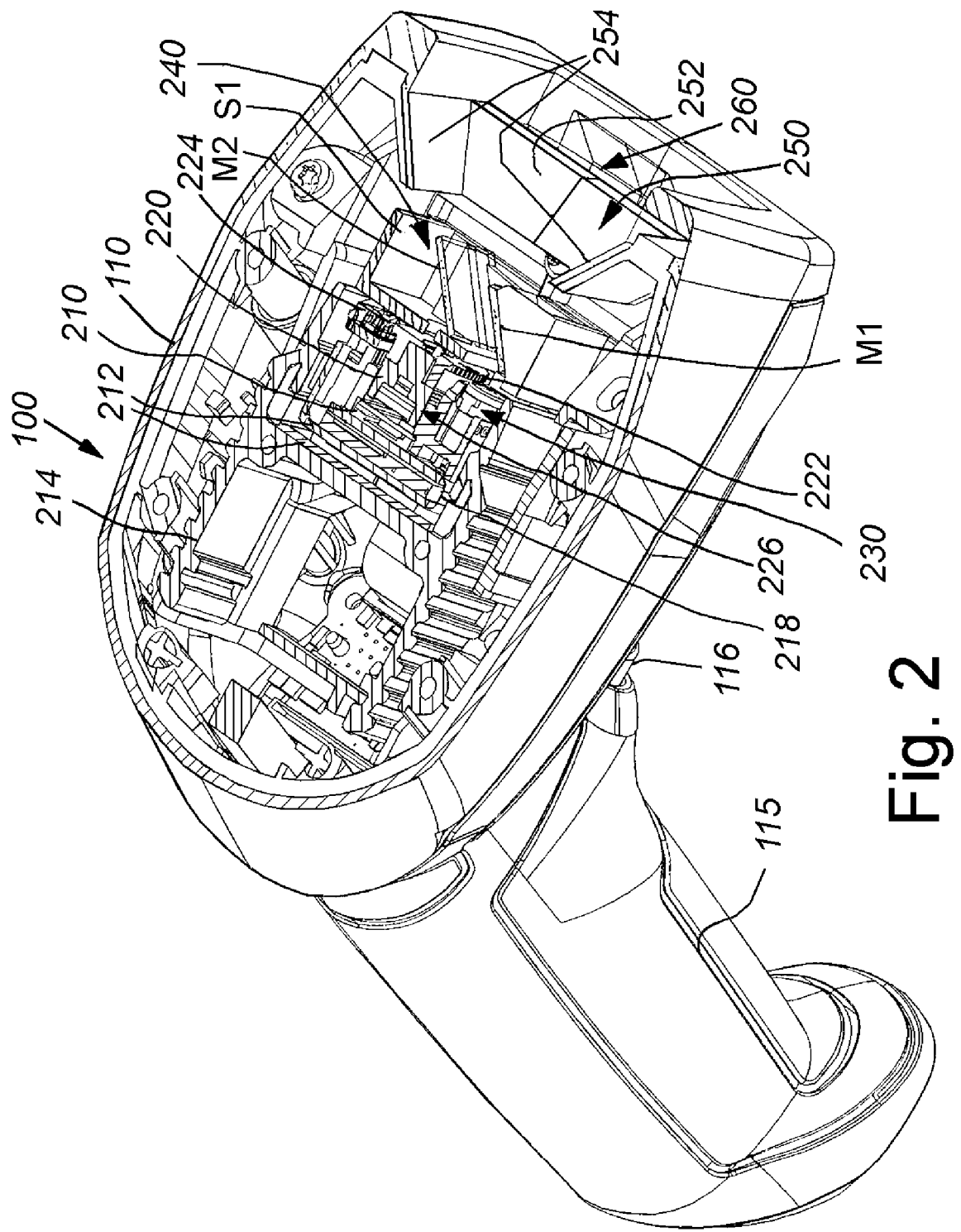
FIG. 2 is a exposed top perspective view of the internal structure of the vision system of FIG. 1.

With reference to FIG. 2, the internal components of the vision system 100 are shown in further detail, having exposed the top of the reading head 110 housing. It should be noted that the depicted arrangement of components is illustrative of a wide range of layouts and component types. This illustration is, thus, provided to teach a possible arrangement of components that provide the functions of the illustrative embodiment. As shown, the interior of the reading head 110 includes an image sensor 210 and associated vision system processor assembly 212 that can be provided on one or more circuit boards (and operatively interconnected by appropriate ribbon cable(s) 218). The processor assembly 212 controls both vision system processes (e.g. ID reading and decoding) as well as internal functions, such as projection of the aimer beam, strobe of illumination, auto-focus adjustment, etc. The processor is mounted to a heat sink that extends both forward and rearward in the head 110. In front of the sensor 210 is placed an optics assembly 220 having a series of lenses that project the imaged light onto the area of the sensor. The optics assembly includes an outer gear 222 driven by a focus drive motor/gear 224. This motor gear 224 rotates the optics assembly 220 so that a thread assembly 226 moves it toward or away from the sensor to change the focal distance of the system.

II. Aimer Assembly

Figure 3:
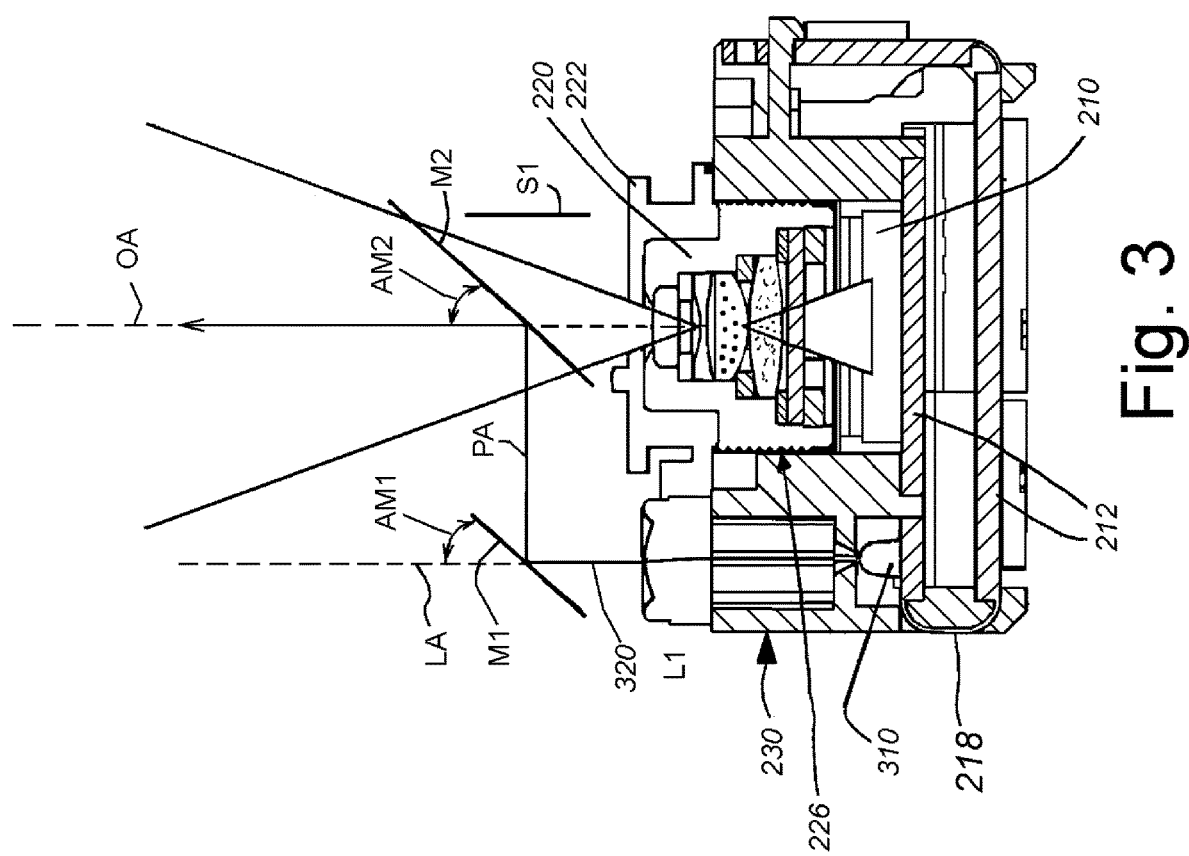
FIG. 3 is a bottom cross section of the image sensor and processor assembly and on-axis aimer assembly of the vision system of FIG. 1.

With reference also to FIG. 3, in front of the optics assembly 220 is positioned a mirror or reflecting assembly, including a first mirror M1 and a second mirror M2, that direct light from an aimer light source 230 from a path/axis LA that is parallel to the camera optical axis OA to a path coaxial with the camera optical axis OA. The aimer light source 230 includes an LED or laser diode 310. Illustratively, the light emitted by the LED/laser diode defines a wavelength (or range of wavelengths) distinct from the light provided by the illuminator. For example, the LED/laser diode 310 can project in a green wavelength range, while the illuminator projects in a red wavelength range.

The aimer light source 230 includes a lens L1 of appropriate shape and characteristics to collimate the light from the LED/laser diode 310 into a beam 320 along axis LA. The first mirror M1 is located in front to the light source 230 and oriented at an angle AM1 of 45 degrees with respect to the axis LA. The first mirror M1, thus, reflects the aimer light beam 320 by an angle of 90 degrees to an orthogonal (perpendicular) path PA. The aimer light beam 320 is then reflected by a second mirror M2 that is oriented at an angle AM2 of 45 degrees with respect to the camera optical axis OA. This second mirror resides within the optical axis as shown. This arrangement causes the aimer light beam to become coaxial with the camera optical axis. Notably, the mirror is dichoric so that it reflects the aimer light and transmits the illumination light. A shield S1 is located on an opposite side of the optical axis OA from the first mirror M1 and defines a plane parallel to the optical axis. Note that in alternate embodiments the plane of the shield S1 can be non-parallel to more effectively reflect stray light in a direction other than that of the sensor. This shield S1 can include a light-absorbing surface (e.g. matte black), and is arranged to prevent stray light and ghost-images potentially caused by passage of any unreflected light of the aimer light beam 320 through the second mirror M2. As shown in FIG. 2, the mirrors M1, M2 and shield S1 can be mounted onto a small (e.g. injection molded) plastic frame 240 that resides in front of the overall sensor/optics module. Alternatively, the aimer beam lens L1 and the mirrors M1 and M2 can be integrated into a single optical part.

It should be clear that, while mirrors (e.g. M1 and M2) are each oriented at the depicted 45-degree angle as shown and described, the relative angle of mirrors used to align the aimer beam with respect to the camera optical axis can be varied in accordance with conventional optical design. For example, the second (dichoric) mirror M2 can be oriented at a 30 to 60-degree angle with respect to the camera optical axis OA, and the incident beam from the aimer is angled either by the first mirror M1, or by the orientation of the beam source (see below), to direct the beam onto the optical axis OA.

The width and height of at least the second mirror M2 is typically large enough to cover the entire field of view. In this manner, the acquired image is not interrupted by the mirror's edges. The first mirror M1 is at least large enough in area to cover the collimated beam.

With respect to the characteristics of the second mirror M2, dichroic mirror glass (or polymer) is a material containing multiple micro-layers of metals or oxides which give the material dichroic optical properties (a form of thin-film optics). The primary characteristic of dichroic glass is that it defines a specific transmitted color and a completely different reflected color, as certain wavelengths of light either pass through or are reflected. Because the aimer light beam 320 is one wavelength (e.g. green) and the scene is illuminated by a distinct, differing wavelength (e.g. red), the dichoric mirror M2 can be coated so that illumination light from the imaged scene passes through the mirror, while the aimer light beam is reflected by the coating (or vice versa, as described below).

In an alternate embodiment, the dichoric mirror M2 can be substituted with a conventional semi-reflecting mirror acting, in essence as a beam splitter. Then, instead of using different wavelengths for the aimer and the illuminator, a similar wavelength is used for both lights. When the aimer beam is projected onto the second mirror M2, part of the beam is transmitted to the target while the remainder (approximately 50%) passes through the second mirror M2 and strikes the shield S1. This arrangement thus results in light-loss of approximately 50% both in received light from the imaged scene and in the projected aimer pattern.

Note that the aimer collimator lens L1 can be arranged in accordance with skill in the art of optics design to maintain a relatively constant beam diameter over the working distance or to diverge slightly for increasing distance. In this manner the user is provided with a larger viewable dot at longer distances for ease and convenience and also to assist him/her in gauging the actual viewing distance to the object.

Figure 3A:
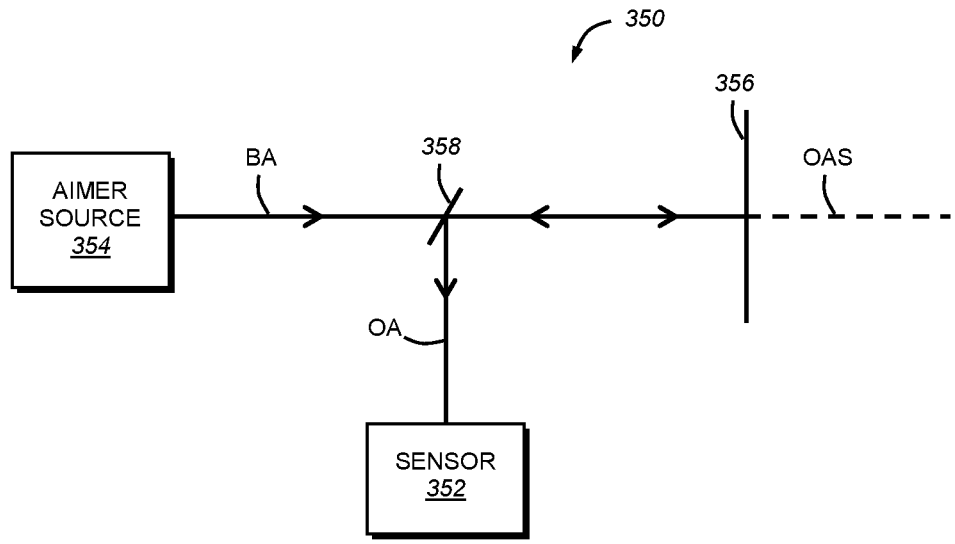
FIG. 3A is a schematic view of an arrangement of an aimer light source, image sensor and dichoric mirror according to an embodiment in which the illumination light from the scene is reflected by the mirror and the aimer light beam is transmitted onto a common optical axis to the scene.

While an arrangement having a beam source that projects a beam parallel to the optical axis and is then reflected onto the axis by mirrors M1 and M2 is shown and described, it is expressly contemplated that a variety of alternate arrangements can be provided to achieve the goal of aligning the aimer beam with the camera optical axis at the scene, while selectively transmitting only received (illumination) light from the scene to the image sensor. With reference to an alternate arrangement 350 of FIG. 3A, the sensor 352 is oriented with an optical axis OA at a right angle (or another non-parallel angle) with respect to the projection axis BA of the aimer beam source 354. In this arrangement 350, the light from the scene 356 travels along an optical axis OAS that is then turned 90 degrees (or another angle) by the dichoric mirror 358 onto the sensor axis OA. Thus, in this embodiment, the mirror 358 is tuned to reflect illumination light from the scene 356, while the aimer beam transmits through the mirror 358.

Figure 3B:
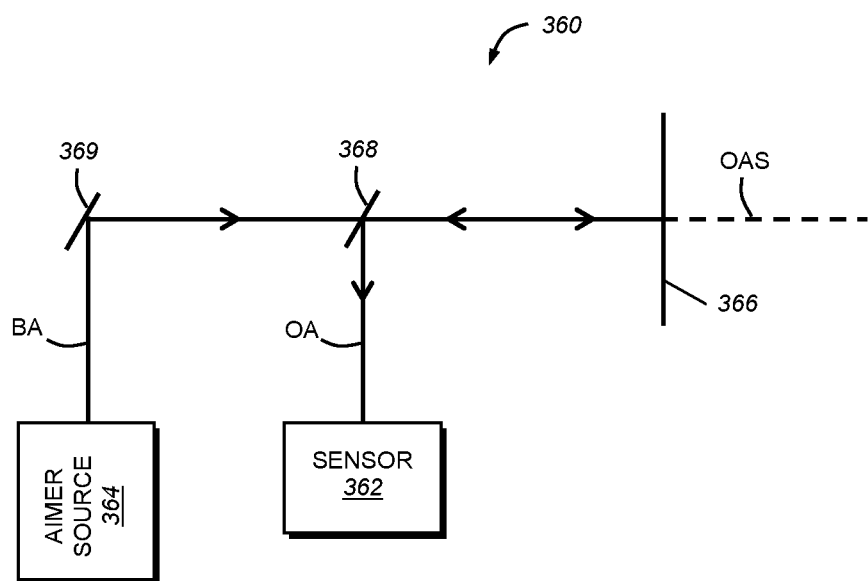
FIG. 3B is a schematic view of an arrangement of an aimer light source, image sensor and dichoric mirror according to an embodiment in which the illumination light from the scene is reflected by the mirror and the aimer light beam is transmitted onto a common optical axis to the scene, and in which the aimer light source is aligned to project its beam through a first mirror and thereafter onto the dichoric mirror.

A similar arrangement 360 is shown in FIG. 3B. The mirror 368 is again tuned to reflect illumination light along axis OAS from the scene 366 and into the sensor 362 along axis OA. The beam source 364 initially projects along axis BA parallel to the sensor axis OA and then turns with reflecting mirror 369 onto the common axis OAS. The dichoric mirror 368 permits the aimer beam light to pass therethrough. Clearly, there exist a wide range of alternate arrangements using an optical element with a dichoric filter coating in which the scene illumination is transmitted and the aimer beam is reflected or the aimer beam is transmitted and the scene illumination is reflected.

Figure 3C:
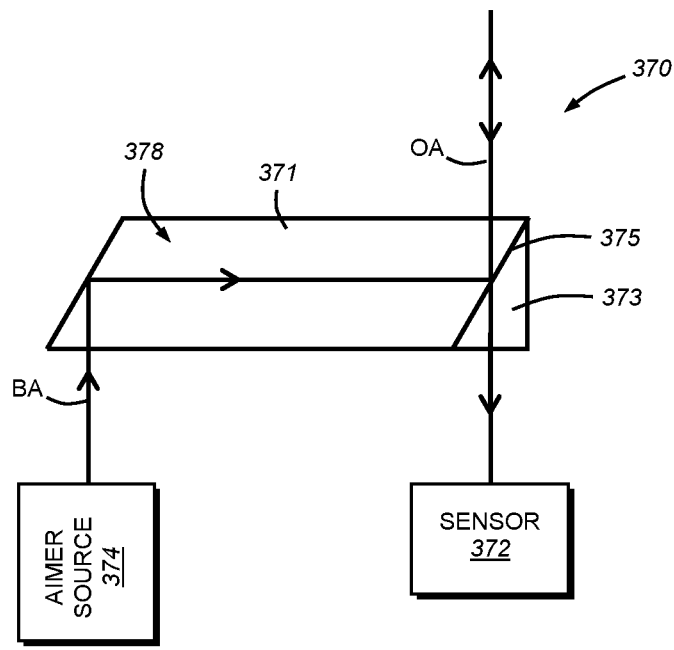
FIG. 3C is a schematic view of a prism assembly according to an embodiment comprising two prisms with a dichoric coating therebetween in which the illumination light from the scene is reflected by the mirror and the aimer light beam is transmitted onto a common optical axis to the scene.

By way of further example, reference is made to the arrangement 370 of FIG. 3C in which thin mirrors, including a dichoric mirror (M2, 358, 368), have been substituted with an assembly 378 of two combined prisms 371, 373. These prisms include a dichoric layer 375 therebetween and can be constructed from glass or an appropriate polymer (e.g. injection molded acrylic, polycarbonate, etc.). As shown, the prisms effectively turn the aimer beam from its initial projection axis BA at the source 374 through the body of the prism 371 and reflected by the layer 375 onto the common optical axis OA with the received illumination light from the scene. This received illumination light is transmitted through the coating 375 to the sensor 372.

Figure 3D:
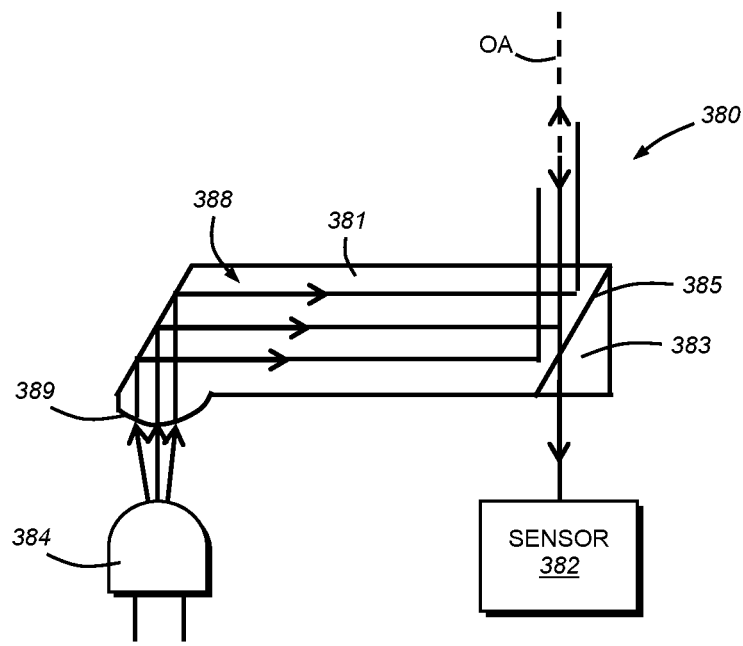
FIG. 3D is a schematic view of a prism assembly according to an embodiment comprising two prisms with a dichoric coating therebetween in which the illumination light from the scene is reflected by the mirror and the aimer light beam, from a collimated LED source, is transmitted onto a common optical axis to the scene.

Similarly, as shown in the arrangement 380 of FIG. 3D, an LED source 384 with either a separate, or unitarily molded (in the case, for example, of a polymer prism assembly 388), collimating lens 389 projects a beam at the dichoric coating 385 located between the two separate prisms 381 and 383. The coating reflects the collimated LED beam onto the common optical axis. Illumination light from the scene, in a differing wavelength, is transmitted through the coating to the sensor 382 as shown. It should again be clear that a variety of prismatic arrangements can be provided to allow selective transmission or filtering of aimer light versus illumination light from the scene.

III. Illuminator Assembly

Figure 4:
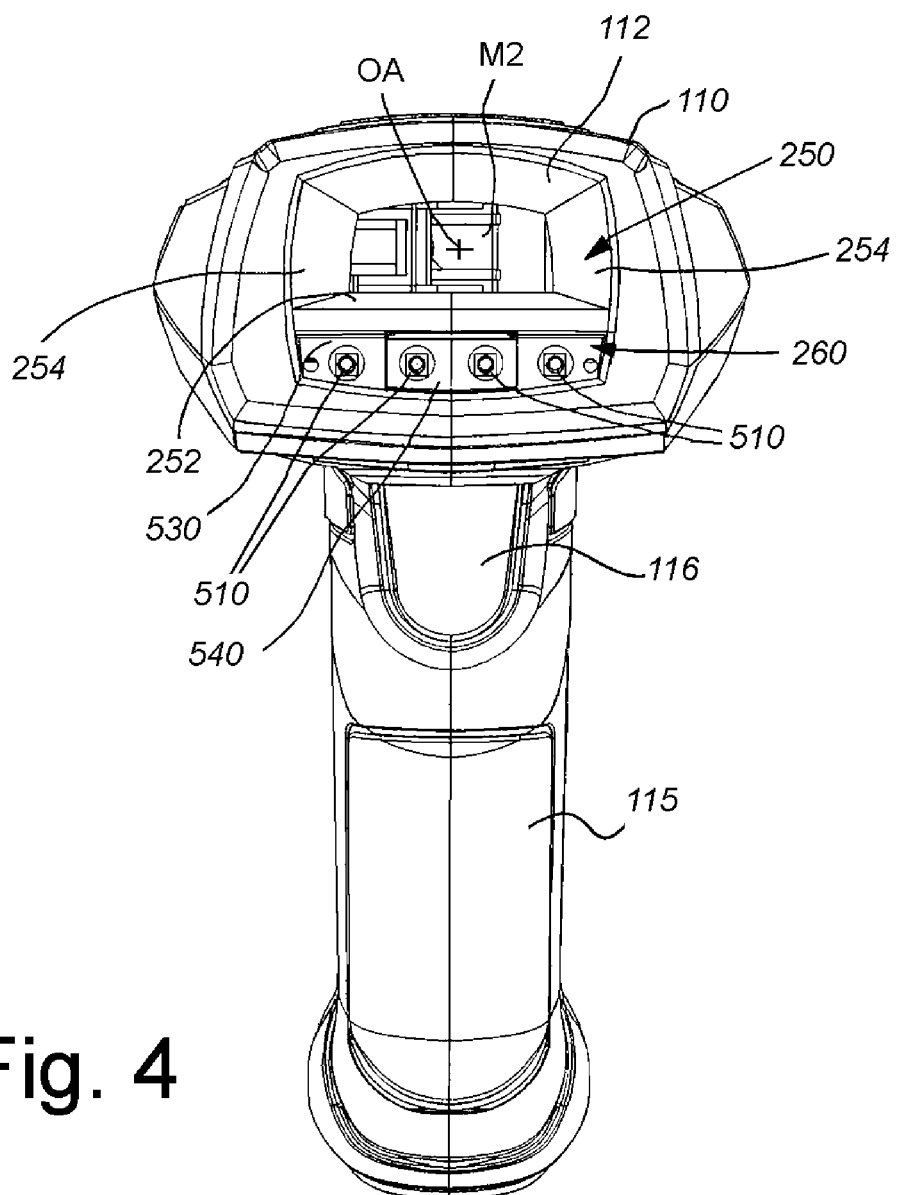
FIG. 4 is a front view of the vision system of FIG. 1 depicting the reading head window and illuminator assembly.

With reference to FIG. 2 and also the front view of FIG. 4, an illuminator assembly 260 is provided beneath a shield assembly 250 that includes a floor 252 covering the illuminator assembly and an inwardly tapered set of side walls 254 that collectively serve to shield-out external reflections and stray light and funnel light from the imaged scene into the sensor 210 and associated optics 220. The illuminator assembly 260, thus, resides below the optical axis OA, outside the field of view.

Figure 5:
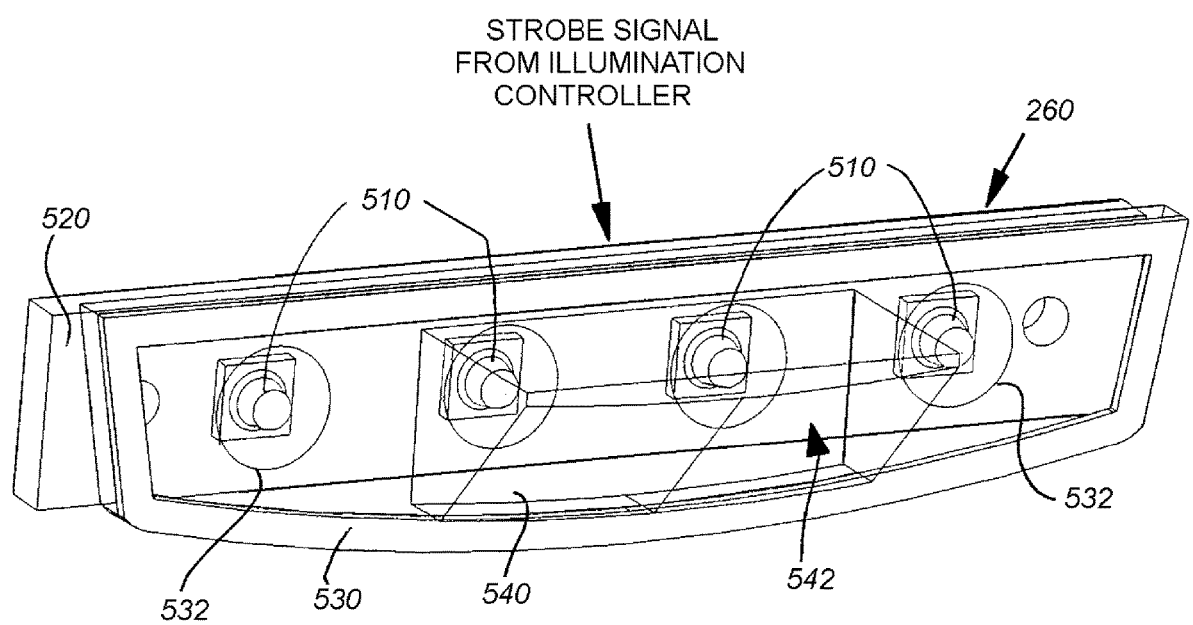
FIG. 5 is a more detailed perspective view of a full-range internal illumination assembly for the vision system of FIG. 1.

With further reference to FIG. 5, the illuminator assembly consists of four high-output LEDs 510 mounted equidistantly across the width of the window (112) on a circuit board 520. The board is directed by the processor assembly (212) to provide a strobed illumination pattern to the scene during image acquisition. While LEDs are employed in this embodiment, other light sources and types in varying numbers can be substituted in alternate embodiments. The transparent (or translucent) cover 530 placed in front of the LEDs is designed to provide both a long range collimated pattern of light and a zero or short range collimated pattern of light concurrently. This is achieved by providing the two outermost LEDs with a convex lens structure 532 that collimates the light and reduces spread out to the maximum working distance, with the beams of the two LEDs effectively crossing and filling the far edges of the field of view. The two central LEDs are covered by a prismatic structure 540 that redirects part of the light into the center and onto the optical axis. Thus, at short ranges the two central LEDs ensure that the central region of the field of view is appropriately illuminated. A variety of prismatic structures, light pipes, Fresnel lenses, beveled surfaces, etc. (generally termed herein, "light-redirecting elements"), can be employed to achieve the redirecting effects that enable concurrent short range and long range distribution of light described herein. In this embodiment, the structure is a beveled wedge in which the bottom face 542 generates partial internal reflection to project light upwardly toward the optical axis OA. The surface of the cover 530 can be transparent or partially diffusive (i.e. frosted) as desired to create the appropriate effect. As described above, the illumination color for all LEDs 510 is red, but LEDs that project other colors (or other non-visible wavelengths) of light are expressly contemplated. Moreover, differing LEDs in the arrangement can output different, discrete colors/wavelengths. It is also expressly contemplated that the LEDs of the illuminator can transmit in a non-visible (e.g. UV or IR) wavelength. The reflecting assembly can be tuned to either transmit or reflect such wavelengths. Under certain circumstances the aimer beam can transmit in a non-visible wavelength (for example where it is viewed by a machine or through night vision equipment).

Figure 6:
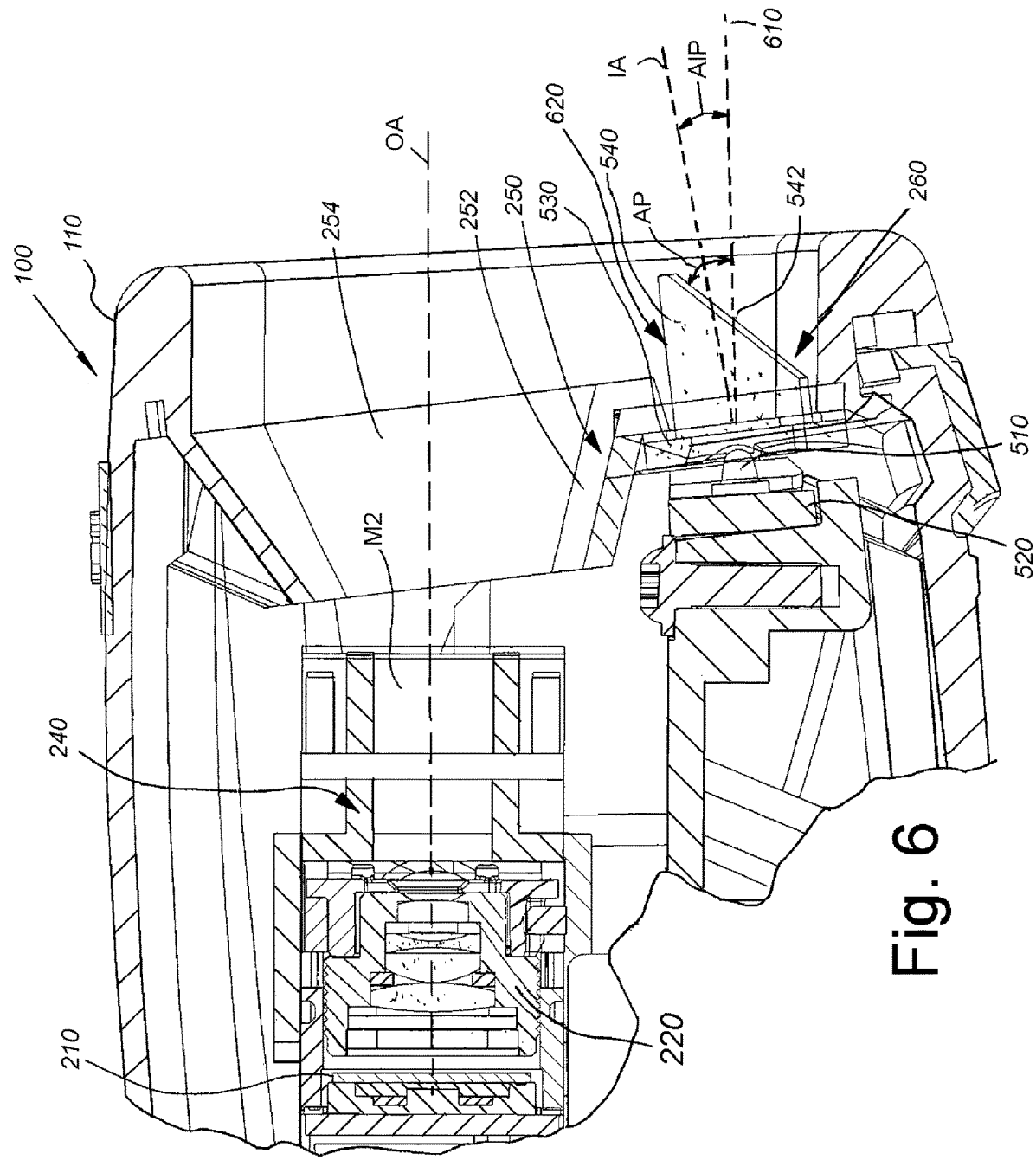
FIG. 6 is a fragmentary side cross section of the reading head of the vision system of FIG. 1 showing the positioning of the illumination assembly of FIG. 5 therein.

As shown in FIG. 6, the illuminator assembly 260 is oriented at an upward angle toward the optical axis OA. This, in part, compensates for its off-axis placement beneath the field of view. The upward angle AIP of the projection axis IA is approximately 8-12 degrees relative to a line 610 parallel to the camera optical axis OA. In this embodiment the beveled face 542 of the prismatic structure 540 is arranged at an angle AP of approximately 45 degrees with respect to the top surface 620 and associated projection axis IA. This angle is variable in alternate embodiments.

Figure 7:
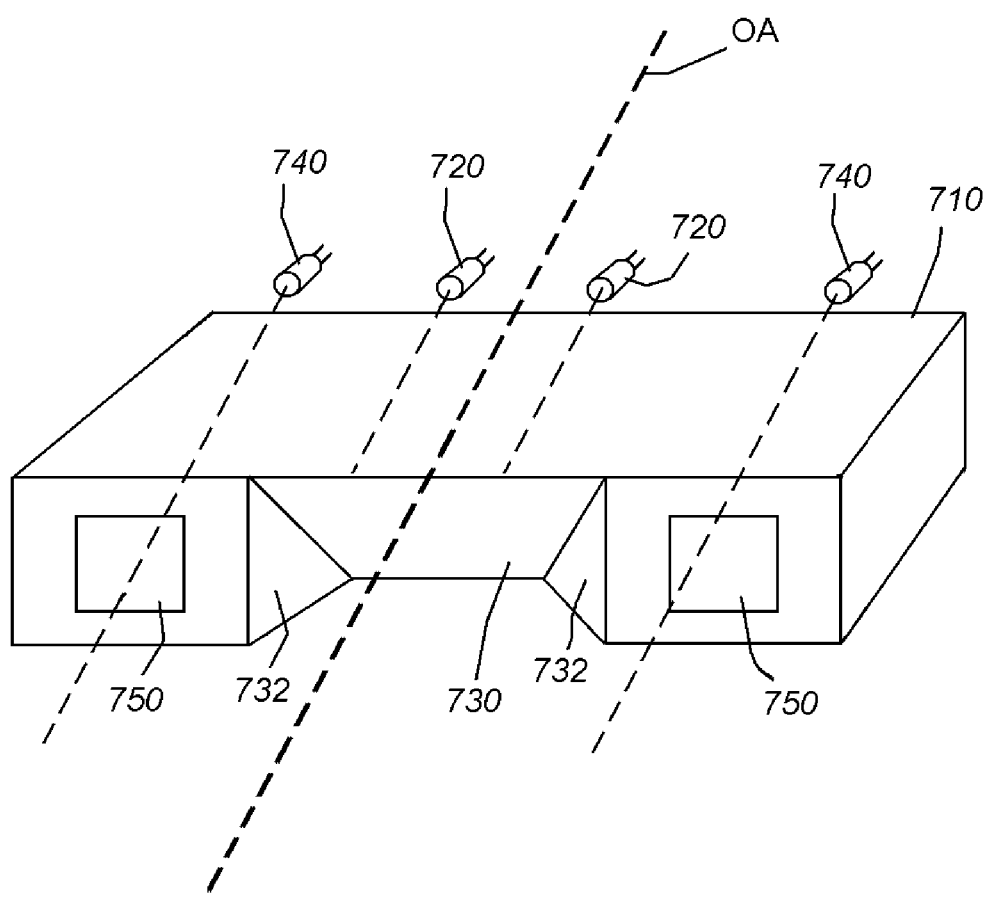
FIG. 7 is a perspective view of a full-range internal illumination assembly according to another embodiment.

A variety of geometries can be provided to the illuminator cover in alternate embodiments. FIG. 7 details an alternate embodiment of and illuminator cover 710. It is contemplated that a version of this cover 710 can be mounted beneath the field of view of the vision system as shown generally in FIG. 6. In this embodiment, the central LEDs 720 project into a beveled region 730 with triangular side wings 732. This region 730 causes a prismatic effect that directs light upwardly toward the optical axis OA. The two outer LEDs 740 project into collimating lenses 750 formed into the cover material. These lenses, like others herein, can be cylindrical, toroid or another appropriate lens shape. Like the above-described cover 530, a combination of collimation of the light of some LEDs and prismatic redirection of the light of other LEDs results in a fully illuminated field of view at both long viewing range and short (to zero) viewing range.

It should be clear that the above-described aimer and illuminator provide enhanced usability and reliability over a wide range of working distances.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the illuminator, while provided to the bottom of the window can be provided to the top of the window or one or both sides in alternate embodiments. Likewise, the illuminator or the aimer can be used individually without (free of) the other in alternate embodiments. Moreover, while the aimer beam LED/laser diode initially projects a beam parallel to the optical axis, it is contemplated that the beam can be projected along the orthogonal path directly into the second mirror in alternate embodiments or that a different arrangement of mirrors (or similar light-bending structures) can be used to direct the light form the source to the second mirror. Moreover, in alternate embodiments, the light path of the aimer light beam can be arranged so that the mirrors are oriented at an angle other than 45 degrees with respect to the optical axis direction. Moreover, while the aimer light beam is termed "substantially coaxial with" the optical axis, the arrangement of the second mirror can still include slight offset, generating a beam that is slightly angled with respect to the camera optical axis or slightly angled with respect to the camera optical axis. This variation still provides a relatively true aim point at short and longer working distances. Moreover, while wavelengths of various light sources are generated by the internal electro-optical characteristics of those light sources (e.g. green LEDs, red LEDs, etc.), it is expressly contemplated that particular wavelengths can be provided by appropriate filters using broader-band light sources. Additionally, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as the acting direction of gravity. Accordingly, this description is meant to be taken only by way of example, and not to otherwise limit the scope of this invention.

What is claimed is:

1. A vision system that projects an aimer pattern onto an imaged scene comprising:
   a vision system camera assembly having an image sensor, optics and camera optical axis;
   an aimer light source projecting an aimer light beam along an aimer beam axis; and
   a reflecting assembly that is constructed and arranged to either (a) selectively reflect light from the aimer light beam and transmit light from the imaged scene, or (b) selectively reflect light from the imaged scene and transmit light from the aimer light beam, so that the aimer beam axis is substantially aligned with the camera optical axis at the imaged scene,
   wherein the aimer light source includes a collimator lens constructed and arranged to maintain either (a) an approximately constant size aimer pattern over a predetermined working distance or (b) a diverging aimer pattern having a size that increases relative to the working distance.

2. The vision system as set forth in claim 1 wherein the reflecting assembly includes a dichroic element residing along the camera optical axis.

3. The vision system as set forth in claim 2 wherein the aimer light beam defines a first wavelength that is either (a) reflected by the dichroic element or (b) transmitted by the dichroic element, and the scene is illuminated in at least a second wavelength that is either (a) transmitted through the dichroic element into the optics and the image sensor or (b) reflected by the dichroic element into the optics and the image sensor.

4. The vision system as set forth in claim 1 wherein the reflecting assembly includes a mirror residing along the optical axis that is a semi-reflective mirror.

5. The vision system as set forth in claim 1 wherein the aimer light source projects the aimer light beam along a first axis approximately parallel to the camera optical axis and the reflector assembly comprises a mirror assembly including a first mirror oriented at approximately a non-parallel angle to the first axis and a second mirror, residing on the camera optical axis oriented at approximately a non-parallel angle to the camera optical axis.

6. The vision system as set forth in claim 5 wherein the non-parallel angle is approximately 45 degrees and the second mirror is a dichroic mirror.

7. The vision system as set forth in claim 1 wherein the vision system camera assembly is enclosed in a handheld ID reader.

8. The vision system as set forth in claim 1 further comprising an internal illuminator assembly located in the handheld ID reader remote from the field of view of the vision system camera assembly and projecting light on the imaged scene.

9. The vision system as set forth in claim 8 wherein the internal illumination assembly includes a plurality of light sources projecting through a cover in which at least some of the light sources are collimated and at least some of the light sources are directed through a light redirecting element on the cover.

10. The vision system as set forth in claim 8 wherein the reflecting assembly includes a dichroic mirror and the aimer light beam defines a first wavelength that is either (a) reflected by the dichroic mirror or (b) transmitted by the dichroic mirror and the illuminator assembly projects light in at least a second wavelength that is either (a) transmitted through the dichroic mirror or (b) reflected by the dichroic mirror, respectively.

11. The vision system as set forth in claim 10 wherein the first wavelength is in a green visible light range and the second wavelength is in a red visible light range.

12. The vision system as set forth in claim 10 wherein either the first wavelength or the second wavelength is non-visible.

13. The vision system as set forth in claim 1 wherein the reflecting assembly is a pair of prisms with a dichroic coating on a boundary therebetween.

14. The vision system as set forth in claim 5 further comprising a shield located on an opposite side of the camera optical axis with respect to the first mirror.

15. The vision system as set forth in claim 14 wherein the first mirror, the second mirror, and the shield are each mounted onto a plastic frame.

16. The vision system as set forth in claim 2 wherein the dichroic element comprises a dichroic mirror glass comprising multiple micro-layers of metals or oxides.

17. The vision system as set forth in claim 5 wherein the second mirror is sized to cover an entire field of view.

18. The vision system as set forth in claim 1 wherein the first mirror is sized to cover the aimer light beam, the aimer light beam being collimated by a collimated lens.

19. An aimer assembly for a vision system having an optical axis, comprising:
  an aimer light source that projects an aimer light beam along an aimer beam axis, the aimer beam axis being approximately parallel to the optical axis;
  a mirror assembly comprising a first mirror oriented at approximately a non-parallel angle to the aimer beam axis and a second mirror residing on the optical axis and oriented at approximately a non-parallel angle to the optical axis,
  wherein the mirror assembly is constructed and arranged to either (a) selectively reflect light from the aimer light beam and transmit light from an imaged scene, or (b) selectively reflect light from the imaged scene and transmit light from the aimer light beam, so that the aimer beam axis is substantially aligned with the optical axis at the imaged scene.

20. An aimer assembly for a vision system having an optical axis, comprising:
  an aimer light source that projects an aimer light beam along an aimer beam axis, the aimer beam axis being approximately parallel to the optical axis;
  a mirror assembly comprising a first mirror oriented at approximately a non-parallel angle to the aimer beam axis, wherein the first mirror is sized to cover the aimer light beam, the aimer light beam being collimated by a collimated lens,
  wherein the mirror assembly is constructed and arranged to either (a) selectively reflect light from the aimer light beam and transmit light from an imaged scene, or (b) selectively reflect light from the imaged scene and transmit light from the aimer light beam, so that the aimer beam axis is substantially aligned with the optical axis at the imaged scene.

* * * * *